United States Patent
Yamakawa et al.

(10) Patent No.: US 7,897,281 B2
(45) Date of Patent: *Mar. 1, 2011

(54) BINDER COMPOSITION FOR ELECTRIC DOUBLE LAYER CAPACITOR ELECTRODE

(75) Inventors: Masahiro Yamakawa, Tokyo (JP); Hidekazu Mori, Tokyo (JP)

(73) Assignee: Zeon Corporation, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 10/549,480

(22) PCT Filed: Mar. 17, 2004

(86) PCT No.: PCT/JP2004/003559
§ 371 (c)(1), (2), (4) Date: Sep. 15, 2005

(87) PCT Pub. No.: WO2004/084245
PCT Pub. Date: Sep. 30, 2004

(65) Prior Publication Data
US 2006/0251966 A1    Nov. 9, 2006

(30) Foreign Application Priority Data
Mar. 18, 2003 (JP) ............... 2003-074563

(51) Int. Cl.
| H01M 4/36 | (2006.01) |
| H01M 4/62 | (2006.01) |
| H01M 4/02 | (2006.01) |
| C08L 31/02 | (2006.01) |
| C08L 33/08 | (2006.01) |
| C08L 33/10 | (2006.01) |
| C08K 3/00 | (2006.01) |

(52) U.S. Cl. ............ 429/217; 429/209; 524/424; 524/556; 524/565; 524/566

(58) Field of Classification Search ......... 429/217, 429/209; 524/543, 556, 565, 566, 424
See application file for complete search history.

(56) References Cited

U.S. PATENT DOCUMENTS

| 6,341,057 B1 * | 1/2002 | Nissen et al. ............ 361/502 |
| 6,621,684 B2 | 9/2003 | Shimamoto et al. |
| 6,656,633 B2 * | 12/2003 | Yamakawa et al. ........ 429/217 |
| 7,316,864 B2 * | 1/2008 | Nakayama et al. ........ 429/217 |
| 7,567,429 B2 | 7/2009 | Mori et al. |
| 2002/0034686 A1 * | 3/2002 | Yamakawa et al. ........ 429/217 |

FOREIGN PATENT DOCUMENTS

| JP | 5-3137 A | | 1/1993 |
| JP | 08107047 A | * | 4/1996 |
| JP | 08-157677 A | | 6/1996 |
| JP | 8-287915 A | | 11/1996 |
| JP | 11-162794 A | | 6/1999 |
| JP | 2000-208368 A | | 7/2000 |
| JP | 2000-299109 A | | 10/2000 |
| JP | 2001-307965 A | | 11/2001 |
| JP | 2002-110169 A | | 4/2002 |
| JP | 2002/039518 A1 | | 5/2002 |
| JP | 2002-256129 A | | 9/2002 |
| JP | 2003-151554 A | | 5/2003 |
| WO | WO 98/39808 A1 | | 9/1998 |
| WO | WO 01/29917 A1 | | 4/2001 |
| WO | WO 03036744 A1 | * | 5/2003 |

OTHER PUBLICATIONS

Office Action mailed Jul. 22, 2010 from Co-Pending U.S. Appl. No. 10/567,119.
U.S. Appl. No. 10/567,119 Office Action dated Jun. 10, 2008.
U.S. Appl. No. 10/567,119 Office Action dated Dec. 29, 2008.
U.S. Appl. No. 10/567,119 Office Action dated Sep. 24, 2009.
U.S. Appl. No. 10/567,119 Office Action dated Feb. 4, 2010.

* cited by examiner

*Primary Examiner* — Vasu Jagannathan
*Assistant Examiner* — Karuna P Reddy
(74) *Attorney, Agent, or Firm* — Birch, Stewart, Kolasch & Birch, LLP

(57) ABSTRACT

The present invention provides a new binder composition for an electrode for an electric double layer capacitor which comprises a binder good in binding force and excellent in heat resistance, an electrode for an electric double layer capacitor having this binder, and an electric double layer capacitor which is high in capacity and is electrochemically stable by use of a binder composition for an electrode for an electric double layer capacitor comprising a binder polymer and water, wherein said binder polymer comprises: 50 to 98% by mole of monomer units (a) derived from a compound represented by the following general formula: $CH_2=CR^1-COOR^2$ (1) wherein $R^1$ represents a hydrogen atom or an alkyl group, and $R^2$ represents an alkyl group having 2 to 18 carbon atoms or a cycloalkyl group having 3 to 18 carbon atoms, 1 to 30% by mole of monomer units (b) derived from an α,β-ethylenically unsaturated nitrile compound, and 0.1 to 10% by mole of monomer units (c) derived from a multifunctional ethylenically unsaturated carboxylic acid ester; has a glass transition temperature from −80 to 0° C.

5 Claims, No Drawings

BINDER COMPOSITION FOR ELECTRIC DOUBLE LAYER CAPACITOR ELECTRODE

TECHNICAL FIELD

The present invention relates to a binder composition for an electrode for an electric double layer capacitor, an electrode produced by use of this binder, and an electric double layer capacitor having this electrode.

BACKGROUND ART

About electric double layer capacitors, wherein an electric double layer made of a polarized electrode and an electrolytic interface is used, in particular, coin-shaped ones, the demand thereof as memory backup power sources has been rapidly expanding in recent years. Meanwhile, attention has been paid to the use of electric double layer capacitors, which are characterized by having a high power density, for articles for which a large capacity is necessary, such as power sources for electromobile.

As the electrode material of electric double layer capacitors, a carbonaceous material, such as active carbon, is mainly used. In order to cause the carbonaceous material to be held on a current collector, the carbonaceous material is used by mixing with a binder polymer, which may be referred to merely as a binder hereinafter. As a conventional binder for an electrode for an electric double layer capacitor, polytetrafluoroethylene (PTFE) has been used. As the method for binding a carbonaceous material containing a binder onto the surface of a current collector, there has been adopted a method of incorporating and dispersing the carbonaceous material into a solution or latex of the binder to prepare a slurry (in the form of a homogeneous paint), applying the slurry onto the current collector, and then drying the applied slurry.

However, in the case of using PTFE as the binder, the following problems are caused: when the amount thereof is small, the binding force thereof to the current collector is insufficient; and when the amount is large, the internal resistance of the electrode becomes high.

Against the above-mentioned problems, there have made some approaches for supplying an electrode which has flexibility and excellent binding force by use of a small amount of an elastomer as the binder. For example, suggested are a method of using a styrene-butadiene based polymer having a specific composition as the binder (see Japanese Patent Application Laid-Open (JP-A) No. 11-162794); and a method of using a mixture of a styrene-butadiene based polymer and a cellulose based polymer as the binder (see JP-A Nos. 2000-208368 and 2001-307965).

However, these binders have a problem of being poor in heat resistance. In other words, the binders have the following problem. Active carbon, which is used as electrode material, easily adsorbs water since active carbon has a large specific surface area. It is therefore necessary to dry the slurry thereof applied onto a current collector at high temperature so as to remove water therefrom. However, when a styrene-butadiene based polymer is used as the binder therefor, its flexibility is lost by the high-temperature drying so that the active carbon is peeled from the current collector or the electrochemical stability lowers.

Thus, an object of the present invention is to provide a new binder composition for electric double layer capacitor which comprises a binder having a good binding force and an excellent heat resistance, and an electrode having the binder. Another object of the invention is to provide an electrochemically stable electric double layer capacitor having a high capacity.

DISCLOSURE OF THE INVENTION

In order to solve the above-mentioned problems, the inventors have made eager investigations. As a result, the inventors have found out that a binder which comprises an acrylate copolymer having a specific composition and has a glass transition temperature within a specific range is excellent in binding force, flexibility and heat resistance. The inventors have also found out that an electric double layer capacitor having an electrode produced by use of this binder has a high capacity and electrochemical stability. On the basis of these findings, the present invention has been made.

Thus, according to the present invention, provided is a binder composition for an electrode for an electric double layer capacitor comprising a binder polymer and water, wherein said binder polymer comprises:

50 to 98% by mole of monomer units (a) derived from a compound represented by the following general formula:

$$CH_2=CR^1-COOR^2 \qquad (1)$$

wherein $R^1$ represents a hydrogen atom or an alkyl group, and $R^2$ represents an alkyl group having 2 to 18 carbon atoms or a cycloalkyl group having 3 to 18 carbon atoms, 1 to 30% by mole of monomer units (b) derived from an α,β-ethylenically unsaturated nitrile compound, and 0.1 to 10% by mole of monomer units (c) derived from a multifunctional ethylenically unsaturated carboxylic acid ester;

has a glass transition temperature from −80 to 0° C.

According to the present invention, provided is also a slurry for an electrode for an electric double layer capacitor, comprising the above-mentioned binder composition for the electrode for the electric double layer capacitor, and a carbonaceous material.

Furthermore, according to the present invention, provided is an electrode for an electric double layer capacitor, wherein an electrode layer is bound onto a current collector, the electrode layer comprising a carbonaceous material and a binder polymer which comprises:

50 to 98% by mole of monomer units (a) derived from a compound represented by the following general formula:

$$CH_2=CR^1-COOR^2 \qquad (1)$$

wherein $R^1$ represents a hydrogen atom or an alkyl group, and $R^2$ represents an alkyl group having 2 to 18 carbon atoms or a cycloalkyl group having 3 to 18 carbon atoms, 1 to 30% by mole of monomer units (b) derived from an α,β-ethylenically unsaturated nitrile compound, and 0.1 to 10% by mole of monomer units (c) derived from a multifunctional ethylenically unsaturated carboxylic acid ester; and has a glass transition temperature from −80 to 0° C.; and provided is an electric double layer capacitor having this electrode.

BEST MODES FOR CARRYING OUT THE INVENTION

The present invention will be described hereinafter.

(1) Binder Composition for an Electrode for an Electric Double Layer Capacitor

The binder composition of the present invention for an electrode for an electric double layer capacitor is a composition comprising a binder polymer and water, wherein said binder polymer comprises:

monomer units (a) derived from a compound represented by the following general formula:

$$CH_2=CR^1-COOR^2 \qquad (1)$$

wherein $R^1$ represents a hydrogen atom or an alkyl group, and $R^2$ represents an alkyl group having 2 to 18 carbon atoms or a cycloalkyl group having 3 to 18 carbon atoms; monomer units (b) derived from an α,β-ethylenically unsaturated nitrile compound; and monomer units (c) derived from a multifunctional ethylenically unsaturated carboxylic acid ester.

The content of the monomer units (a) derived from a compound represented by the general formula (1) in the binder polymer used in the present invention is from 50 to 98% by mole, preferably from 60 to 90% by mole of the total of the polymer. If the content of the monomer units derived from a compound represented by the general formula (1) is too small, the binding force of the electrode layer and the flexibility of the electrode may lower.

In the general formula (1), $R^1$ represents a hydrogen atom or an alkyl group. The number of carbon atoms in the alkyl group is usually from 1 to 10, preferably from 1 to 3, and more preferably 1.

$R^2$ represents an alkyl group having 2 to 18 carbon atoms or a cycloalkyl group having 3 to 18 carbon atoms. The alkyl group is preferred. The number of carbon atoms therein is more preferably from 3 to 16, in particular preferably from 4 to 12.

Examples of the compound represented by the general formula (1) include alkyl acrylates such as ethyl acrylate, propyl acrylate, isopropyl acrylate, n-butyl acrylate, isobutyl acrylate, t-butyl acrylate, n-amyl acrylate, isoamyl acrylate, n-hexyl acrylate, 2-ethylhexyl acrylate, hexyl acrylate, nonyl acrylate, lauryl acrylate, and stearyl acrylate; alkyl methacrylates such as ethyl methacrylate, propyl methacrylate, isopropyl methacrylate, n-butyl methacrylate, isobutyl methacrylate, t-butyl methacrylate, n-amyl methacrylate, isoamyl methacrylate, n-hexyl methacrylate, 2-ethylhexyl methacrylate, octyl methacrylate, isodecyl methacrylate, lauryl methacrylate, tridecyl methacrylate, and stearyl methacrylate; cycloalkyl acrylates such as isobornyl acrylate; and cycloalkyl methacrylates such as cyclohexyl methacrylate. Of these, n-butyl acrylate and 2-ethylhexyl acrylate are particularly preferred.

These compounds represented by the general formula (1) may be used alone or in combination of two or more thereof.

The content of the monomer units (b) derived from an α,β-ethylenically unsaturated nitrile compound in the binder polymer is from 1 to 30% by mole, preferably from 3 to 25% by mole, more preferably from 5 to 22% by mole of the total of the polymer. If the content of the monomer units (b) derived from an α,β-ethylenically unsaturated nitrile compound is too large, the flexibility of the electrode tends to be poor and the heat resistance thereof tends to lower. Examples of the α,β-ethylenically unsaturated nitrile compound include acrylonitrile and methacrylonitrile.

The content of the monomer units (c) derived from a multifunctional ethylenically unsaturated carboxylic acid ester in the polymer is from 0.1 to 10% by mole, preferably from 0.2 to 7% by mole, more preferably from 0.5 to 5% by mole of the total of the polymer. When the content of the monomer units derived from a multifunctional ethylenically unsaturated carboxylic acid ester is in this range, the polymer can be rendered a polymer having a high resistance against electrolytic solution.

Examples of the multifunctional ethylenic carboxylic acid ester include dimethacrylates such as ethylene glycol dimethacrylate, diethylene glycol dimethacrylate, 1,3-butylene glycol dimethacrylate, and polyethylene glycol dimethacrylate; trimethacrylates such as trimethylolpropane trimethacrylate; diacrylates such as diethylene glycol diacrylate, 1,3-butylene glycol diacrylate, tripropylene glycol diacrylate, 1,4-butanediol acrylate, neopentyl glycol diacrylate, 1,6-hexanediol acrylate, 1,9-nonanediol acrylate, and polyethylene glycol diacrylate; and triacrylates such as trimethylolpropane triacrylate.

The binder polymer used in the present invention may have monomer units (d) derived from an ethylenically unsaturated carboxylic acid besides the monomer units (a), (b) and (c). The content of the monomer units (d) derived from an ethylenically unsaturated carboxylic acid is preferably from 1 to 10% by mole, more preferably from 2 to 7% by mole of the total of the polymer. When the content of the monomer units derived from an ethylenically unsaturated carboxylic acid is in this range, the binding force of the electrode layer to a current collector can be improved.

Examples of the ethylenically unsaturated carboxylic acid include ethylenically unsaturated monocarboxylic acids such as acrylic acid, methacrylic acid and crotonic acid; and ethylenically unsaturated dicarboxylic acids such as maleic acid, fumaric acid, citraconic acid, mesaconic acid, glutaconic acid, itaconic acid, crotonic acid, and isocrotonic acid. Of these, ethylenically unsaturated monocarboxylic acids such as acrylic acid and methacrylic acid are preferred.

It is preferred that the binder polymer used in the present invention does not substantially have any monomer unit derived from a conjugated diene such as butadiene or isoprene. Since a polymer having a monomer unit derived from a conjugated diene has a double bond in the molecular chain, on the basis of this, crosslinking thereof advances or deterioration thereof is caused by oxidizing, so that the binding force of the heated and dried electrode layer may lower.

The binder polymer used in the present invention may comprise a monomer unit derived from a copolymerizable monomer as long as the advantageous effects of the invention are not reduced. Examples of the copolymerizable monomer include 1-olefins such as ethylene, propylene and 1-butene; acrylic acid esters having an alkyl group with a substituent, such as hydroxyethyl acrylate, hydroxypropyl acrylate, hydroxybutyl acrylate, and dimethylaminoethyl acrylate; methacrylic acid esters in which the alkyl group thereof has a substituent, such as hydroxypropyl methacrylate, dimethylaminoethyl methacrylate, diethylaminoethyl methacrylate, methoxypolyethylene glycol monomethacrylate, and benzyl methacrylate; crotonic acid esters such as methyl crotonate, ethyl crotonate, propyl crotonate, butyl crotonate, isobutyl crotonate, n-amyl crotonate, isoamyl crotonate, n-hexyl crotonate, 2-ethylhexyl crotonate, and hydroxypropyl crotonate; maleic acid diesters such as dimethyl maleate, dibutyl maleate, and di-2-ethylhexyl maleate; fumaric acid diesters such as dimethyl fumarate, and dibutyl fumarate; itaconic acid diesters such as dimethyl itaconate, and dibutyl itaconate; unsaturated dicarboxylic acid anhydrides such as maleic anhydride, citraconic anhydride, and itaconic anhydride; aromatic vinyl compounds such as styrene, α-methylstyrene, 2-methylstyrene, 3-methylstyrene, and 4-methylstyrene.

These monomers may be used in combination of two or more thereof. The total of the contents of these monomer units is 15% or less by mole, preferably 5% or less by mole of the total of the polymer.

The glass transition temperature (Tg) of the binder polymer is from −80 to 0° C., preferably from −60 to −5° C., more preferably from −50 to −10° C. If the Tg is too high, the flexibility and the binding force of the electrode lower so that its electrode layer is easily peeled from the current collector. If the Tg is too low, the discharge capacity of the capacitor may lower.

The particle diameter of the binder polymer is usually from 50 to 1000 nm, preferably from 70 to 800 nm, more preferably from 100 to 500 nm. If the particle diameter is too large, a necessary amount of the binder becomes too large so that the internal resistance of the electrode may increase. Conversely, if the particle diameter is too small, the binder may cover and hide the surface of the carbonaceous material to inhibit the reaction. The particle diameter is a number-average particle diameter obtained by measuring the diameters of 100 polymer particles which are randomly selected on a transmission electron microscopic photograph and calculating the arithmetic average thereof.

The method for producing the binder is not particularly limited. The binder can be obtained by polymerizing the above-mentioned respective monomers by a known polymerization method such as emulsion polymerization, suspension polymerization, dispersion polymerization or solution polymerization. Of these, the production by emulsion polymerization is preferred since the particle diameter of the polymer is easily controlled.

The binder composition of the present invention is a composition in which the above-mentioned binder polymer is dispersed in water. The method for dispersing the polymer into water is not particularly limited. It is advisable that the polymer made into a fine particle form by, for example, spray-drying technique or pulverizing is incorporated and dispersed into water in accordance with an ordinary method. When the binder polymer is obtained as an aqueous dispersion by the above-mentioned emulsion polymerization, it is allowable to use the polymer directly as the binder composition of the invention without being isolated, by adjusting the concentration thereof by concentration or dilution as needed. The concentration (solid content quantity) of the binder dispersed in water is usually from 20 to 70% by mass.

(2) Slurry for an Electrode for an Electric Double Layer Capacitor

The slurry for an electrode for an electric double layer capacitor of the present invention comprises the binder composition of the present invention and a carbonaceous material, and optionally comprises a thickener. In the electrode slurry of the invention, the carbonaceous material acts as an active material for an electrode and an electroconductivity supplying agent.

The active material for the electrode, on which electrolyte ion is adsorbed in an electric double layer capacitor, is preferably powder which is made of active carbon, polyacene or the like and has a specific surface area of 30 $m^2/g$ or more, preferably of 200 to 3500 $m^2/g$. A fiber or powder such as carbon fiber, carbon whisker or graphite can also be used if the specific surface area thereof is in the above-mentioned range. As the active carbon, a phenol type, a rayon type, an acrylic type, a pitch type, a coconut shell type or some other type can be used. It is allowable to use, as the active material for the electrode, non-porous carbon described in JP-A No. 11-317333 or JP-A No. 2002-25867 and having carbon microcrystals similar to graphite in which the inter-phase distance of the microcrystals is enlarged. When the particle diameter of the active material is from 0.1 to 100 μm, preferably from 1 to 20 μm, the capacitor electrode can easily be made into a thin film and the capacity density thereof can also be made high. This case is preferred.

Examples of the electroconductivity supplying agent include electroconductive carbons such as acetylene black, Ketchen black, and carbon black. Any one of them is used in the form of a mixture with the above-mentioned active material for an electrode. It is preferred to disperse the electroconductivity supplying agent evenly in advance and then use the resultant to blend with the active material. When the electroconductivity supplying agent is used together with the active material in this way, the electric contact between individuals of the active material is further improved so that the internal resistance of the electric double layer capacitor becomes low and further the capacity density thereof can be made high. About the blend ratio between the active material for the electrode and the electroconductivity supplying agent, the amount of the electroconductivity supplying agent is from 0.1 to 20 parts by mass, preferably from 2 to 10 parts by mass for 100 parts by mass of the active material.

The amount of the binder polymer in the slurry of the present invention is preferably from 0.1 to 20 parts by mass, more preferably from 0.5 to 10 parts by mass for 100 parts by mass of the carbonaceous material. If the amount of the binder polymer is too small, the carbonaceous material falls off easily from the electrode. Conversely, if the amount is too large, the carbonaceous material is covered and hided with the binder so that the internal resistance of the electrode may increase.

The thickener in the slurry in the invention is used to improve the applicability of the electrode slurry or give fluidity thereto. The kind of the thickener is not particularly limited, and is preferably a water-soluble polymer.

Specific examples of the water-soluble polymer include cellulose based polymers, such as carboxymethylcellulose, methylcellulose and hydroxypropylcellulose, and ammonium salts and alkali metal salts thereof, polyacrylic (or polymethacrylic) acid salts such as sodium polyacrylate (or polymethacrylate), polyvinyl alcohol, polyethylene oxide, polyvinyl pyrrolidone, copolymer of acrylic acid or an acrylic acid salt and vinyl alcohol, copolymer of maleic anhydride, maleic acid or fumaric acid and vinyl alcohol, modified polyvinyl alcohol, modified polyacrylic acid, polyethylene glycol, polycarboxylic acid, oxidized starch, phosphorylated starch, casein, and various modified starches. The used amount of the water-soluble polymer is from 0.5 to 5 parts by mass, preferably from 1 to 3 parts by mass per part by mass of the carbonaceous material.

The slurry for an electrode for an electric double layer capacitor of the present invention can be produced by mixing the binder composition of the present invention, an active material for an electrode, an optional thickener and an optional electroconductivity supplying agent by use of a mixer. As the mixer, there can be used a ball mill, a sand mill, a pigment disperser, a grinding crusher, an ultrasonic disperser, a homogenizer, a planetary mixer, a hovered mixer, or the like. The method for the mixing and the order of the mixing are not particularly limited. It is preferred to mix an aqueous solution of the thickener and the electroconductivity supplying agent to disperse the electroconductivity supplying agent into a fine particle form, add thereto the active material for the electrode and the binder composition, and mixing the components homogeneously. It is also preferred to mix the active material for the electrode and the electroconductivity supplying agent with a mixer such as a grinding crusher, a planetary mixer, a Henschel mixer, or an Omni mixer, add thereto an aqueous solution of the thickener, disperse the active material for the electrode and the electroconductivity supplying agent homogeneously, add thereto the binder composition, and mixing the components homogeneously. By adopting these methods, a homogeneous slurry can easily be obtained.

(3) Electrode for Double Layer Capacitor

The electrode for the electric double layer capacitor of the present invention is an electrode in which an electrode layer comprising the above-mentioned binder polymer and carbonaceous material is bound onto a current collector.

No especial limitation is imposed on the current collector if the current collector is made of a material having electroconductivity and electrochemical durability. Preferred are metal materials such as aluminum, titanium, tantalum, stainless steel, gold, and platinum, and particularly preferred are aluminum and platinum from the viewpoint of heat resistance thereof. The shape of the current collector is not particularly limited. Usually, the current collector in the form of a sheet having a thickness of about 0.001 to 0.5 mm is used.

The electrode for the electric double layer capacitor of the invention can be produced by applying the electrode slurry of the invention onto the current collector and then drying the slurry. The method for applying the electrode slurry onto the current collector is not particularly limited. Examples thereof include doctor blade, dip, reverse roll, direct roll, gravure, extrusion, and brush painting methods. The amount of the applied slurry is not particularly limited. The amount is generally such an amount that the thickness of the electrode layer which is made of the carbonaceous material, the binder and so on and is formed after drying will be usually from 0.005 to 5 mm, preferably from 0.01 to 2 mm. Examples of the method for the drying include drying with warm wind, hot wind or low-humidity wind, vacuum drying, and radiation of (far) infrared rays or electron beams. The temperature for the drying is usually from 120 to 250° C., preferably from 150 to 250° C. Furthermore, the density of the active material in the electrode may be made high by pressing the dried current collector. Examples of the method for the pressing include mold pressing and roll pressing.

(4) Electric Double Layer Capacitor

The electric double layer capacitor of the present invention has the above-mentioned electrode. The electric double layer capacitor can be produced by an ordinary method using the above-mentioned electrodes, an electrolytic solution, a separator and other parts. Specifically, for example, the capacitor can be produced by stacking the electrodes to sandwich a separator therebetween, winding or folding this in accordance with the shape of the capacitor, putting the resultant into a container, pouring an electrolytic solution into the container, and then sealing the opening thereof.

As the separators, a known separator can be used, example thereof including a fine pore film or nonwoven fabric made of a polyolefin such as polyethylene or polypropylene, and a porous film made mainly of pulp which is generally called electrolytic capacitor paper. Instead of the separator, a solid electrolyte or a gel electrolyte may be used.

No especial limitation is imposed on the electrolytic solution, and is preferably a non-aqueous electrolytic solution, wherein an electrolyte is dissolved in an organic solvent.

As the electrolyte, any electrolyte known in the prior art can be used. Examples thereof include tetraethylammonium tetrafluoroborate, triethylmonomethylammonium tetrafluoroborate, and tetraethylammonium hexafluorophosphate.

No especial limitation is imposed on the solvent (electrolytic solution solvent) in which the electrolyte is dissolved if the solvent is a liquid which is generally used as electrolytic solution solvent. Specific examples thereof include propylene carbonate, ethylene carbonate, butylene carbonate, γ-butyrolactone, sulfolane, and acetonitrile. These may be used alone or in the form of a mixed solvent made of two or more thereof.

EXAMPLES

The present invention will be described by way of the following examples. However, the invention is not limited thereto. In the examples, part(s) and % are ones based on mass unless otherwise specified.

Tests and evaluation in working examples and comparative examples were performed by the following methods.

<Test Methods and Evaluation Methods>

(1) Composition Ratio of Binder Polymer

The content by percentage of each of monomer units (composition ratio) in a binder polymer was obtained by $^1$H- and $^{13}$C-NMR measurement.

(2) Particle Diameter of Binder Polymer

The particle diameter of a binder polymer was obtained as the number-average particle diameter obtained by measuring 100 polymer particles which are randomly selected on a transmission electron microscopic photograph and then calculating the arithmetic average thereof.

(3) Glass Transition Temperature (Tg)

The Tg of a binder polymer was measured by using a differential scanning calorimeter (DSC) at a temperature elevation rate of 10° C./minute.

(4) Electrolytic Solution Swelling Ratio of Binder Polymer

A binder composition was applied onto a glass plate so as to give a polymer film of about 0.1 mm thickness, and then the film was air-dried at room temperature for 24 hours. Furthermore, the film was vacuum-dried at 120° C. for 2 hours. The obtained cast film was cut off into a piece about 2 cm square, and the mass thereof was measured. Thereafter, the piece was immersed into an electrolytic solution of 70° C. The immersed film was pulled up after 72 hours, and wiped out with a paper towel. The mass thereof was immediately measured, and the value of (the mass after the immersion)/(the mass before the immersion) was defined as the electrolytic solution swelling ratio. As the electrolytic solution, there was used a solution in which tetraethylammonium tetrafluoroborate was dissolved in propylene carbonate to give a concentration of 1 mole/liter. The resistance of the binder polymer against electrolytic solution is higher as the electrolytic solution swelling ratio thereof is smaller.

(5) Cyclic Voltammetry (CV Value)

Acetylene black and a binder composition were mixed to give the ratio of the acetylene black: the binder polymer=100:40 (solid content ratio by mass) to prepare a homogeneous slurry. The resultant slurry was applied onto an aluminum foil and dried with a fan drier at 80° C. for 30 minutes. Thereafter, the slurry was vacuum-dried at 150° C. for 20 hours. This was used as a working electrode. Lithium metal foils were used as a counter electrode and a reference electrode, and the same electrolytic solution as used in the (4) was used to measure the cyclic voltammetry. As a device for the measurement, the following were used: a potentiostat (HA-301, manufactured by HOKUTO DENKO Co., Ltd.) and a simplified functional generator (HB-111, manufactured by HOKUTO DENKO Co., Ltd.). Sweeping conditions were as follows: the initial voltage was 3 V at 60° C., the turning-back voltage was 5 V, the sweeping rate was 5 mV/s. The measurement was continuously repeated 3 times, using triangular wave sweeping. The electric current per unit area (CV value, and the unit thereof was $\mu A/cm^2$) at 4.6 V in the third measurement was measured. The binder polymer is more electrochemically stable as the CV value thereof is smaller.

(6) Peel Strength

An electrode was cut into a rectangle with 2.5 cm width and 10 cm length, and the electrode was fixed to direct its electrode layer surface upwards. A cellophane tape was adhered onto the electrode layer surface and the tape was peeled in the direction of 180° angle at a rate of 50 mm/minute. The stress generated was measured 10 times. The average thereof was calculated, and the resultant was used as the peel strength. As this value is larger, the binding strength is higher so that the active material for the electrode is peeled from the current collector with more difficulty.

(7) Discharge Capacity of an Electric Double Layer Capacitor

An electric double layer capacitor was electrically charged up to 2.5 V at 4 mA in a thermostat of 70° C., and the state that the capacitor was charged was kept for 2 hours. Thereafter, the capacitor was discharged up to 0 V at a constant current of 1 mA. In this way, the initial discharge capacity was measured. Furthermore, under the same conditions, the capacitor was recharged, and the state that the capacitor was charged was kept for 100 hours. Thereafter, the capacitor was discharged at a constant current of 1 mA. In this way, the discharge capacity was measured. The unit thereof is mWh/g (of the active material for an electrode).

Example 1

Into a reactor with a stirrer were charged 100 parts of a monomer mixture having a composition shown in Table 1, 1.5 parts of sodium dodecylbenzenesulfonate, 250 parts of ion-exchange water, and 1.5 parts of potassium persulfate. The solution was sufficiently stirred, and then the monomers were polymerized at 80° C. for 5 hours to yield a latex having a solid content of about 30%. The polymerization conversion ratio thereof was 95% or more. This latex was concentrated under a reduced pressure to yield a binder composition as a latex having a solid content of about 40%. This binder composition was used to measure the composition ratio, the particle diameter, the glass transition temperature, the electrolytic solution swelling ratio, and the cyclic voltammetry of the binder polymer. The results are shown in Table 2.

Next, the following were charged: 5 parts of the solid of this binder composition, 100 parts of high-purity active carbon powder having a specific surface area of 1500 $m^2/g$ and an average particle diameter of 10 μm as an active material for an electrode, 4 parts of acetylene black as an electroconductivity supplying agent, and 2 parts of carboxymethylcellulose (Ce-logen (transliteration) 7A, manufactured by Dai-ichi Kogyo Seiyaku Co., Ltd.). Water was added thereto so as to set the concentration of all solids therein into 43%, and then a planetary mixer was used to mix the components for 60 minutes. Thereafter, the resultant solution was diluted with water to give a solid concentration of 41%, and the diluted solution was further mixed for 10 minutes to yield an electrode slurry. A doctor blade was used to apply this slurry onto an aluminum foil of 20 μm thickness, and the applied slurry was dried at 80° C. with a fan drier for 30 minutes, and then vacuum-dried at 250° C. for 72 hours. Thereafter, a roll press machine was used to press the resultant, thereby yielding an electrode having a thickness of 80 μm and a density of 0.6 $g/cm^3$. This electrode was used to measure the peel strength. The result is shown in Table 2.

The electrode as described above was cut out into two circles having a diameter of 15 mm. The electrode layer surfaces of the two electrodes were made opposite to each other, and a separator that was a circular porous film, which had a diameter of 18 mm and a thickness of 25 μm and was made of polypropylene, was sandwiched between the electrodes. This was put into a coin-shaped, outer-packaging, stainless steel container (diameter: 20 mm, height: 1.8 mm, and stainless steel thickness: 0.25 mm) to which a packing made of propylene was fitted. An electrolytic solution was poured into this container so as not to remain air therein. A stainless steel cap of 0.2 mm thickness was put through the polypropylene packing onto the outer-packaging container, and fixed. The container was sealed to produce a coin-shaped electric double layer capacitor having a diameter of 20 mm and a thickness of about 2 mm. The used electrolytic solution was a solution in which tetraethylammonium tetrafluoroborate was dissolved in propylene carbonate to give a concentration of 1 mole/liter. About the thus obtained electric double layer capacitor, the discharge capacity thereof was measured. The result is shown in Table 2.

Examples 2 to 4, and Comparative Examples 1 to 4

Binder compositions, electrode slurries, electrodes, and electric double layer capacitors were produced in the same way as in Example 1 except that mixtures having the composition shown in Table 1 were each used as a monomer mixture. Properties of each of them were measured. The results are shown in Table 2.

TABLE 1

| Monomer mixture composition (parts by mass) | | Examples | | | | Comparative Examples | | | |
|---|---|---|---|---|---|---|---|---|---|
| | | 1 | 2 | 3 | 4 | 1 | 2 | 3 | 4 |
| Component (a) | n-Butyl acrylate | | 86 | | 20 | | | | 35 |
| | 2-Ethylhexyl acrylate | 89 | | 89 | 65 | | | 82 | 58 |
| | Polyethylene glycol methacrylate | | | 3 | | | | | |
| Component (b) | Acrylonitrile | 7 | | 5 | 10 | 12 | 16 | | 7 |
| | Methacrylonitrile | | 12 | | | | | | |
| Component (c) | Diethylene glycol dimethacrylate | | 2 | 3 | 2 | | 3 | 2 | |
| | Tetraethylene glycol dimethacrylate | 4 | | | | | | | |
| Component (d) | Methacrylic acid | | | | 3 | | | | |
| | Itaconic acid | | | | | 5 | | | |
| Other components | Methyl acrylate | | | | | | | 20 | |
| | Methyl methacrylate | | | | | 10 | 65 | | |
| | Styrene | | | | | | 46 | | |
| | Butadiene | | | | | | 39 | | |

TABLE 2

| | | Examples | | | | Comparative Examples | | | |
|---|---|---|---|---|---|---|---|---|---|
| | | 1 | 2 | 3 | 4 | 1 | 2 | 3 | 4 |
| The content (% by mole) of each monomer unit in binder polymer | | | | | | | | | |
| Component (a) | n-Butyl acrylate | | 78 | | 21 | | | | 38 |
| | 2-Ethylhexyl acrylate | 77 | | 81 | 48 | | | 59 | 44 |
| Component (b) | Acrylonitrile | 21 | | 16 | 25 | | 20 | 40 | 18 |
| | Methacrylonitrile | | 21 | | | | | | |
| Component (c) | Diethylene glycol dimethacrylate | | 1 | 2 | 1 | | 1 | 1 | |
| | Tetraethylene glycol dimethacrylate | 2 | | | | | | | |
| Component (d) | Methacrylic acid | | | | 5 | | | | |
| | Itaconic acid | | | | | 3 | | | |
| Other components | Methyl acrylate | | | | | | 21 | | |
| | Methyl methacrylate | | | | | 8 | 58 | | |
| | Polyethylene glycol methacrylate | | | | 1 | | | | |
| | Styrene | | | | | 34 | | | |
| | Butadiene | | | | | 55 | | | |
| Binder polymer properties | | | | | | | | | |
| | Average particle size(nm) | 180 | 200 | 150 | 130 | 160 | 130 | 170 | 180 |
| | Glass transition temperature(° C.) | −45 | −30 | −50 | −35 | −10 | 80 | −35 | −45 |
| | Electrolytic solution swelling ratio | 1.3 | 1.3 | 1.2 | 1.4 | 1.2 | 1.6 | 1.5 | 1.9 |
| | CV value($\mu$A/cm$^2$) | 72 | 75 | 72 | 86 | 265 | 80 | 72 | 77 |
| Electrode properties | | | | | | | | | |
| | Peel strength (N/cm) | 0.15 | 0.15 | 0.16 | 0.18 | 0.05 | 0.02 | 0.06 | 0.10 |
| Capacitor properties | | | | | | | | | |
| | Initial discharge capacity(mWh/g) | 17.6 | 17.2 | 17.8 | 17.8 | 16.6 | 16.9 | 16.2 | 15.5 |
| | Discharge capacity after 100 hours at 70° C.(mWh/g) | 16.4 | 16.3 | 16.5 | 16.1 | 12.6 | 10.2 | 13.4 | 11.5 |

As is evident from Table 2, the binder polymers according to the binder composition of the present invention were high in electric stability and the electrodes using the binder compositions exhibited a high binding strength even if the electrodes were dried at high temperature. Furthermore, the electric double layer capacitors produced by use of the electrodes had a large initial discharge capacity, and gave a small drop in capacity even if the capacitors were kept at high temperature for a long time.

On the other hand, the styrene-butadiene based polymer was low in electric stability, and the flexibility thereof was lost by high-temperature drying. Thus, the electrode produced by use of the polymer as a binder polymer was low in binding strength (Comparative Example 1). The binder polymer made mainly of methyl acrylate units and methyl methacrylate units and the binder polymer in which the content of acrylonitrile units was too large were each low in flexibility; therefore, the electrodes formed by use of these were also low in binding strength (Comparative Examples 2 and 3). The binder polymer comprising no monomer units derived from a multifunctional ethylenically unsaturated carboxylic acid ester swelled with the electrolytic solution. Consequently, the bonding strength thereof lowered and the initial capacity of the capacitor lowered (Comparative Example 4). The electric double layer capacitors produced by use of these electrodes were large in capacity drop when the capacitor was kept at high temperature for a long time.

Some embodiments of the present invention have been described as the above-mentioned working examples. It is evident for those skilled in the art that embodiments in which the working examples are changed can also be carried out as long as they do not substantially depart from the teaching and advantages of the present invention. Such changed embodiments are included in the scope of the present invention. The above-mentioned comparative examples are examples described to demonstrate that the above-mentioned working examples are excellent embodiments by comparison with the working examples. Accordingly, the objects of the present invention may be attained by the content of the comparative examples.

INDUSTRIAL APPLICABILITY

As described above, according to the present invention, it is possible to yield a new binder composition for an electrode for an electric double layer capacitor which comprises a binder good in binding force and excellent in heat resistance, an electrode for an electric double layer capacitor having this binder, and an electric double layer capacitor which is high in capacity and is electrochemically stable.

The invention claimed is:

1. An electric double layer capacitor having an electrolyte and an electrode containing an electrode layer bound onto a current collector;

wherein the electrode layer comprises a carbonaceous material and a binder polymer which comprises:

50 to 98% by mole of monomer units (a) derived from a compound represented by the following formula:

$$CH_2=CR^1-COOR^2 \quad (1)$$

wherein $R^1$ represents a hydrogen atom or an alkyl group, and $R^2$ represents an alkyl group having 2 to 18 carbon atoms or a cycloalkyl group having 3 to 18 carbon atoms, 1 to 30% by mole of monomer units (b) derived from acrylonitrile, and 0.1 to 10% by mole of monomer units (c) derived from a multifunctional ethylenically unsaturated carboxylic acid ester; and has a glass transition temperature from −80 to 0° C., wherein the electrolyte includes tetraethylammonium tetrafluoroborate, triethylmonomethylammonium tetrafluoroborate, or tetraethylammonium hexafluorophosphate.

2. The electric double layer capacitor according to claim 1, wherein the binder polymer further comprises 1 to 10% by mole of monomer units (d) derived from an ethylenically unsaturated carboxylic acid.

3. The electric double layer capacitor according to claim 1, wherein the carbonaceous material comprises active carbon having a specific surface area of 200 to 3500 $m^2/g$.

4. The electric double layer capacitor according to claim 1, wherein the electrode layer further comprises a thickener.

5. The electric double layer capacitor according to claim 3, wherein the carbonaceous material further comprises an electroconductivity supplying agent.

* * * * *